April 14, 1931. J. LEUZINGER 1,801,204
TURNTABLE WITH SUPPORTING AND GUIDING ROLLER
FOR TWO-AXLE MOTOR VEHICLE TRAILERS
Filed Aug. 25, 1928
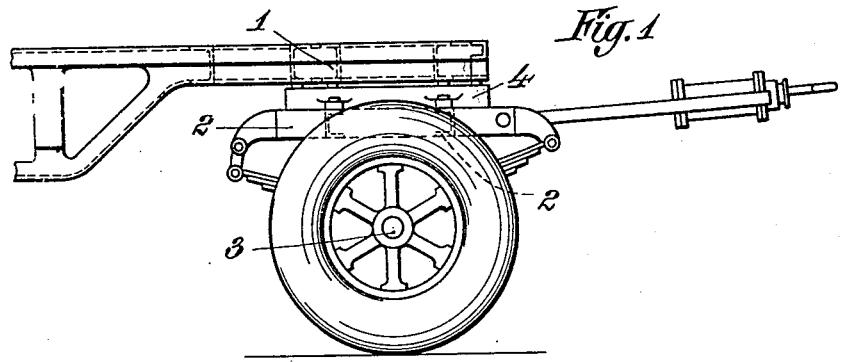
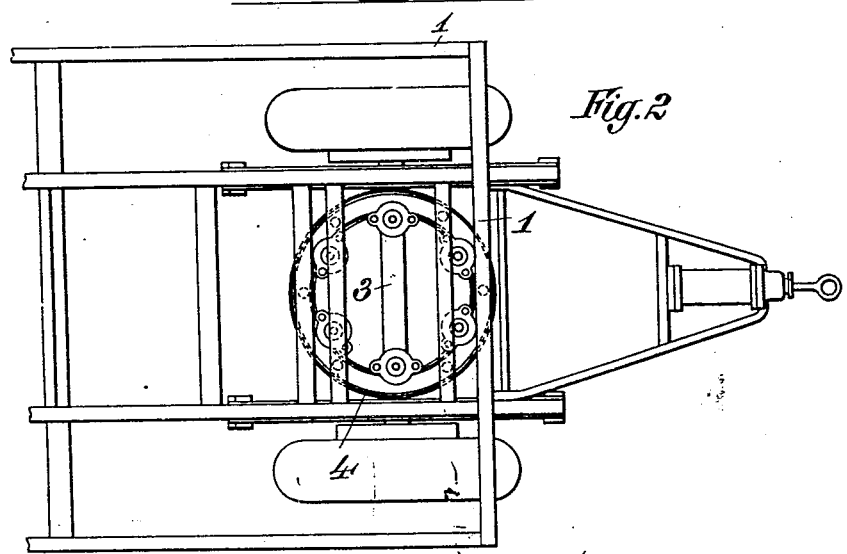
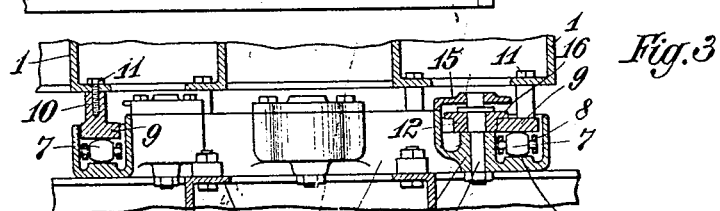
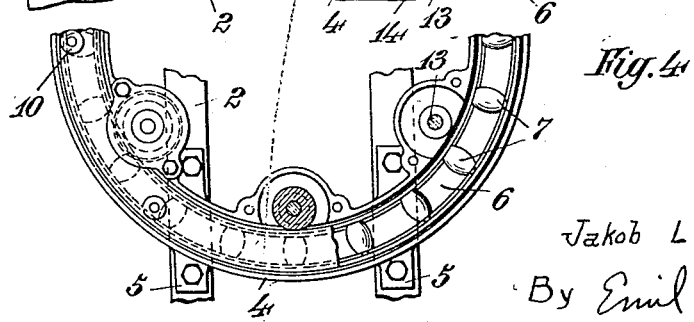
Inventor:
Jakob Leuzinger
By Emil Bönnelycke
Attorney Patented Apr. 14, 1931

1,801,204

UNITED STATES PATENT OFFICE

JAKOB LEUZINGER, OF ZURICH, SWITZERLAND, ASSIGNOR TO A. WELTI-FURRER A.-G., OF ZURICH, SWITZERLAND, A CORPORATION OF SWITZERLAND

TURNTABLE WITH SUPPORTING AND GUIDING ROLLER FOR TWO-AXLE MOTOR-VEHICLE TRAILERS

Application filed August 25, 1928, Serial No. 301,993, and in Germany and Switzerland October 11, 1927.

This invention relates to a turntable with supporting and guiding rollers for motor vehicle trailers. Since such turntables must turn through a very large angle, especially when the trailer is being connected to the motor vehicle, provision must be made for as easy an operation of the table as possible. This requirement is fulfilled by the present invention, in that the support for the chassis on the frame of the table is through an interchangeable roller crown and the rotatable guiding thereof is accomplished by means of fixed guide rollers. The running surface of the roller crown is limited on both sides by lateral flanges, so that a trough for lubricant is formed, on which trough the guide rollers can be journalled. To secure the chassis from being lifted off the axle, the chassis frame rests on the supporting rollers by a flat ring and the guide rollers are each provided with a flange which engages over the said flat supporting ring.

An embodiment of the invention is shown in the accompanying drawing, in which:

Figure 1 is an elevation of the front part of the trailer,

Fig. 2 is a plan of the same,

Fig. 3 is a vertical section through the turntable, on a larger scale, and

Fig. 4 is a plan of the same.

The lattice-like frame 1 is reduced in depth at the front end so as to accommodate the turntable, which is secured to the frame 2 of the front axle 3. On frame 2 is secured, by means of feet 5, an annular member 4 of U-shaped cross-section. The horizontal base 6 forms the running surface for the horizontal supporting rollers 7, radially positioned by a cage 8 and constituting an interchangeable roller crown. The U-shape of the ring member 4 makes it possible to fill it with oil, so that the rollers 7 always run in an oil bath.

On the roller crown 7 and 8, the chassis frame 1 rests by means of a flat ring 9, secured to the underside of the frame by upwardly extending lugs 10 and bolts 11.

The rotary guiding of the frame is accomplished by means of guide rollers 12, uniformly spaced around the periphery of the member 4. These rollers are mounted on pins 13, the bearings 14 for which are cast on the ring 4. The pins 13 are held in their bearings by the covers 15. The guide rollers 12 are each provided with a flange 16, engaging over the ring 9. In this way there is obtained a secure connection between the chassis and the turntable without special securing means.

I claim as my invention:—

1. A turntable for motor vehicle trailers comprising a U-shaped annular member adapted to be mounted on the frame of the front wheels of the trailer; a roller crown in said annular member; a flat ring secured to the chassis of the trailer and adapted to bear and move on the rollers of the roller crown; a plurality of bearings provided in spaced relation in the annular member; and a guide roller for each bearing for securing the flat ring and thereby providing a secure connection between the chassis and the turntable.

2. A turntable for motor vehicle trailers comprising a U-shaped annular member adapted to be mounted on the frame of the front wheels of the trailer; a roller crown in said annular member; a flat ring secured to the chassis of the trailer and adapted to bear and move on the rollers of the roller crown; a plurality of guide rollers mounted in spaced relation in the annular member for securing the flat ring and thereby providing a secure connection between the chassis and the turntable; and a cover for each guide roller for retaining it in place.

3. A turntable for motor vehicle trailers comprising a U-shaped annular member adapted to be mounted on the frame of the front wheels of the trailer; a roller crown in said annular member; a flat ring secured to the chassis of the trailer and adapted to bear and move on the rollers of the roller crown; a plurality of bearings provided in spaced relation in the annular member; a guide roller for each bearing for securing the flat ring and thereby providing a secure connection between the chassis and the turntable; and a cover for each guide roller for retaining it in place, each of said guide rollers having a flange thereon adapted to contact with the flat ring.

4. A turntable for motor vehicle trailers comprising a U-shaped annular member adapted to be mounted on the frame of the front wheels of the trailer; a roller crown in said annular member; a flat ring secured to the chassis of the trailer and adapted to bear and move on the rollers of the roller crown; a plurality of bearings provided in spaced relation in the annular member; a pin for each bearing; a cover for each bearing for holding the pin in the bearing; and a guide roller mounted on each pin for securing the flat ring and thereby providing a secure connection between the chassis and the turntable, each of said guide rollers having a flange thereon adapted to contact with the flat ring.

In testimony whereof I affix my signature.

JAKOB LEUZINGER.